United States Patent
Adamietz et al.

(10) Patent No.: US 7,372,030 B2
(45) Date of Patent: May 13, 2008

(54) METHOD FOR REPRESENTING A FRONT FIELD OF VISION FROM A MOTOR VEHICLE

(75) Inventors: Hubert Adamietz, Kleinostheim (DE); Manfred Hähl, Mühlheim (DE)

(73) Assignee: Siemens Aktiengesellschaft, München (DE)

( * ) Notice: Subject to any disclaimer, the term of this patent is extended or adjusted under 35 U.S.C. 154(b) by 308 days.

(21) Appl. No.: 11/178,735

(22) Filed: Jul. 11, 2005

(65) Prior Publication Data

US 2006/0006331 A1    Jan. 12, 2006

(30) Foreign Application Priority Data

Jul. 12, 2004    (DE)    ...................... 10 2004 033 625

(51) Int. Cl.
    *G02F 1/01*    (2006.01)
(52) U.S. Cl. ..................................... 250/330
(58) Field of Classification Search .................. 250/330
    See application file for complete search history.

(56) References Cited

U.S. PATENT DOCUMENTS

| | | | |
|---|---|---|---|
| 6,370,260 B1 | 4/2002 | Pavlidis et al. | |
| 2003/0095080 A1* | 5/2003 | Colmenarez et al. | 345/7 |
| 2004/0135898 A1* | 7/2004 | Zador | 348/222.1 |
| 2004/0150515 A1 | 8/2004 | Kallhammer et al. | |
| 2004/0227083 A1 | 11/2004 | Kallhammer et al. | |
| 2004/0252862 A1* | 12/2004 | Camus et al. | 382/104 |
| 2006/0048286 A1* | 3/2006 | Donato | 2/422 |
| 2006/0151223 A1 | 7/2006 | Knoll | |

FOREIGN PATENT DOCUMENTS

| | | |
|---|---|---|
| DE | 40 32 927 | 4/1992 |
| DE | 100 16 184 | 10/2001 |
| DE | 102 18 175 A1 | 11/2003 |
| WO | WO 02/36389 | 5/2002 |
| WO | WO 2004/047449 A1 | 6/2004 |

OTHER PUBLICATIONS

German Office Action dated Jan. 21, 2005.
2006Q235474DE ITWissen Das große Online-Lexikon für Informationstechnologie; Oct. 16, 2006, http://www.itwissen.info/index.php?id=31&aoid=9514.
Search Report dated Oct. 16, 2006 issued for the corresponding German Application No. 10 2004 033 625.3-31.

* cited by examiner

*Primary Examiner*—David Porta
*Assistant Examiner*—Mindy Vu
(74) *Attorney, Agent, or Firm*—Cohen Pontani Lieberman & Pavane LLP

(57) ABSTRACT

A method for representing the front field of vision from a motor vehicle on a display panel of a display includes sensing, by an infrared camera system, the field of vision and feeding corresponding infrared data to a data processing unit. The infrared data is modified in the data processing unit on the basis of further information which is fed to the data processing unit and supplied as display data for actuating the display. The infrared camera system is a near-infrared camera system which senses the light from an infrared light source which is reflected from the field of vision and supplies it as corresponding near-infrared data to the data processing unit. A further infrared camera system is a far-infrared camera system which senses the thermal radiation from the field of vision which is fed as corresponding far-infrared data to the data processing unit. Furthermore, the physical variables from the field of vision which are sensed by one or more sensors are fed as corresponding sensor data to the data processing unit.

17 Claims, 3 Drawing Sheets

METHOD FOR REPRESENTING A FRONT FIELD OF VISION FROM A MOTOR VEHICLE

BACKGROUND OF THE INVENTION

The invention relates to a method for representing a field of vision, in particular, a front field of vision from a motor vehicle on a display panel of a display, the method including sensing with an infrared camera system the field of vision and feeding corresponding infrared data to a data processing unit, modifying infrared data in the data processing unit on the basis of further information fed to the data processing unit, and supplying the infrared data as display data for actuating the display.

In such a method for providing night sight assistance it is known to correct the image recorded by a near-infrared camera. To do this, the intensity of the pixel of the display is increased or reduced.

SUMMARY OF THE INVENTION

An object of the invention is to provide a method for representing, in particular, a front field of vision from a motor vehicle on a display panel such that objects in the scenery in the field of vision from the motor vehicle are highly recognizable even at night or in poor visibility conditions.

This object is achieved according to the invention in that the infrared camera system is a near-infrared camera system which senses the light from an infrared light source which is reflected from the field of vision and supplies it as corresponding near-infrared data to the data processing unit, and/or in that the infrared camera system is a far-infrared camera system which senses the thermal radiation from the field of vision which is fed as corresponding far-infrared data to the data processing unit, and/or in that the physical variables from the field of vision which are sensed by one or more sensors are fed as corresponding sensor data to the data processing unit.

The reflected light of the infrared light source is sensed by the near-infrared camera and the corresponding near-infrared data is processed in order to present images. This alone gives rise to a familiar form of representation which does not require any familiarization time for the viewer of the display since it corresponds approximately to the black/white representation of a normal driving situation at night using headlights.

However, in this way it is not possible to sense any heat-emitting objects such as humans or animals located behind an object, for example a bush, sensed by the near-infrared camera system. Such heat-emitting objects are sensed by the far-infrared camera system which picks up the thermal radiation in the field of vision. The presentation in accordance with the far-infrared data is similar to a photonegative image and is therefore not suitable for representation on a display. An observer requires a relatively long familiarization phase to be able to identify relevant objects. However, the recording of thermal images is very homogeneous and facilitates the improvement of long-range vision.

The modification of the near-infrared data by the far-infrared data gives rise to a combination of the spectral ranges of these two systems and thus to an improved direct representation and to a more efficient evaluation of images and identification of objects.

The sensor data may also be processed either for further refinement of the representation or as a replacement for the near-infrared data or the far-infrared data.

In the data processing unit, the near-infrared data is preferably modified by the far-infrared data by superimposition to form display data.

The sensors may be radar sensors and/or ultrasonic sensors and/or ultraviolet sensors. More distant objects may be satisfactorily sensed by radar sensors and closer objects may be sensed by ultrasonic sensors. The advantage of ultraviolet sensors is that ultraviolet signals may also pass satisfactorily through rain and supply signals.

To match the near-infrared data and/or the far-infrared data and/or the sensor data and to optimize such data in the data processing unit, the data may be supplied to an optimization stage such as, for example, a noise filter. Especially near-infrared data may include a high level of information noise of the near-infrared data which results from the large quantity of sensed information and gives rise to representations which are onerous for the viewer. If the near-infrared data and/or the far-infrared data and/or the sensor data is passed through a noise filter, it is possible, for example, to filter the high level of information noise.

The optimization stage may additionally or alternatively have an edge filter through which near-infrared data and/or the far-infrared data and/or the sensor data is passed.

To improve the representation, the optimization stage may additionally or alternatively have a contrast improving stage through which near-infrared data and/or the far-infrared data and/or the sensor data are passed.

If areas of the image information represented by the data are extracted in the data processing unit when processing the near-infrared data and/or the far-infrared data and/or the sensor data, the data of just one area of the overall image may be combined with the data of the complete overall image by the various systems. As a result, a combination may be made of, for example, the data of the complete image for a system which essentially contains the road in front of the motor vehicle and only the data of the area of the lane by another system.

To produce an intensive representation in a specific part of the field of vision and a reduced representation outside the specific part of the field of vision, it is possible to restrict the field of vision in the data processing unit when processing the near-infrared data and to identify objects in the restricted field of vision when processing the far-infrared data.

For this purpose, a virtual lattice can be superimposed on the display data defined by the near-infrared data.

According to a preferred embodiment, one side of the lattice preferably corresponds to a boundary of the roadway.

When an object is identified in the restricted field of vision by the data processing unit it is possible to generate a visual and/or audible warning signal either automatically or in a manually selectable fashion.

In the data processing unit, the near-infrared data may be added to the far-infrared data to form complete display data items of an object.

A pedestrian wearing clothes which have good thermal insulation is recognizable in a representation of the far-infrared data only from his head and hands. The remainder of the pedestrian would be difficult or even impossible to recognize and display using far-infrared data since the clothing prevents thermal emissions. By adding the near-infrared data to the far-infrared data the body of the pedestrian in the direct vicinity of the head and the hands may be completed so that from this compiled information the image processing system can quickly identify a pedestrian.

The display panel of the display may be arranged, for example, as a screen in the motor vehicle.

Alternatively, the representation may be included in a display of a head-up display device. In such a case, the viewer has the direct possibility of comparing the representation with the original image.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar items out the several views.

DETAILED DESCRIPTION OF THE PRESENTLY PREFERRED EMBODIMENTS

Figure 1:
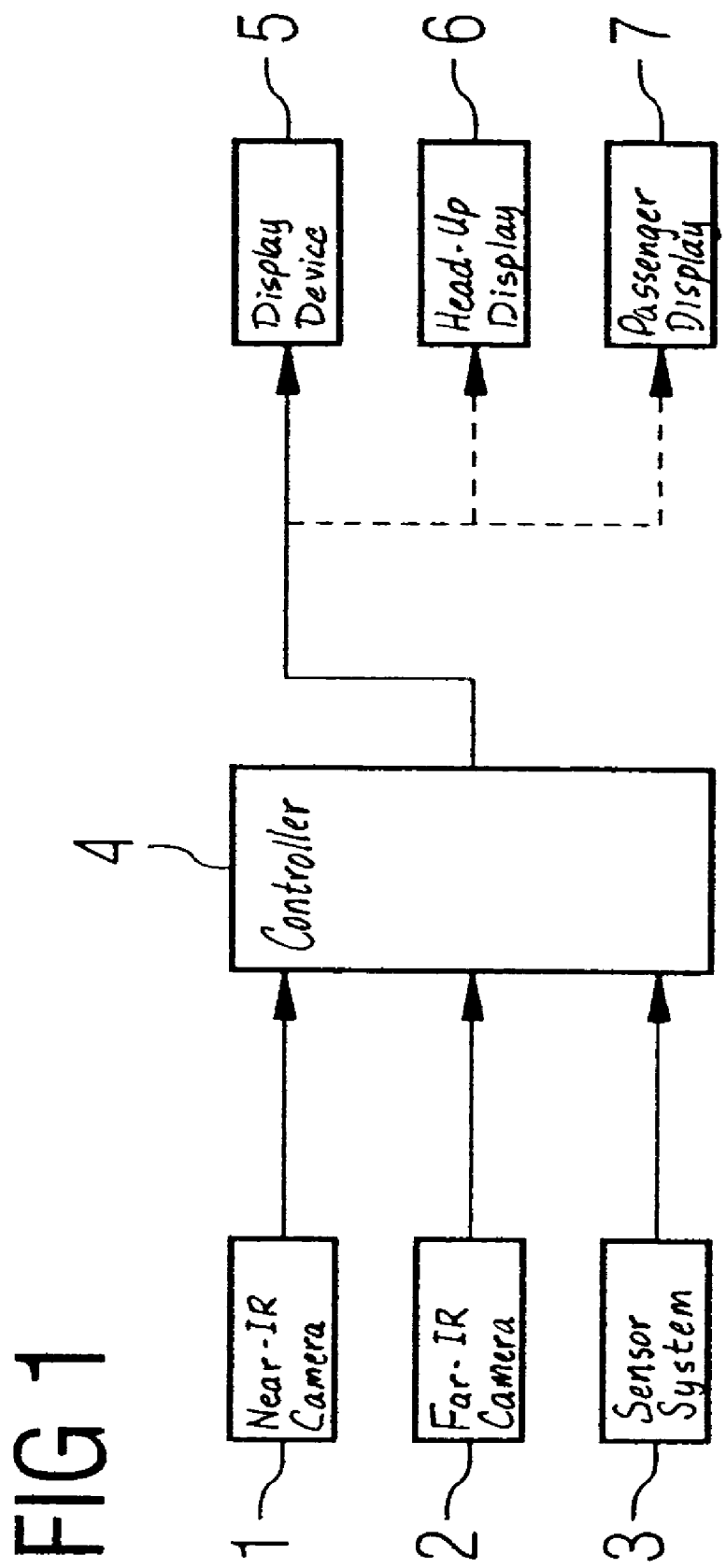
FIG. 1 is a block circuit diagram of a device for carrying out the method ng to the present invention.

The device illustrated in FIG. 1 has a near-infrared camera system 1, a far-infrared camera system 2 and a sensor system 3, collectively referred to as the systems 1, 2, 3. Near-infrared data, far-infrared data and sensor data are fed to a controller 4 by the systems 1, 2, 3 for processing this data. The controller 4 may also be referred to as a data processing unit.

Display data for representation on a display panel of a display are then fed via the output of the controller 4. The display may comprise a display device 5 for displaying the field of vision of the driver on the information panel of a motor vehicle. The display may alternatively or additionally include a display device of a head-up display means 6 and/or a display device 7 in the vicinity of a front seat passenger.

Figure 2:
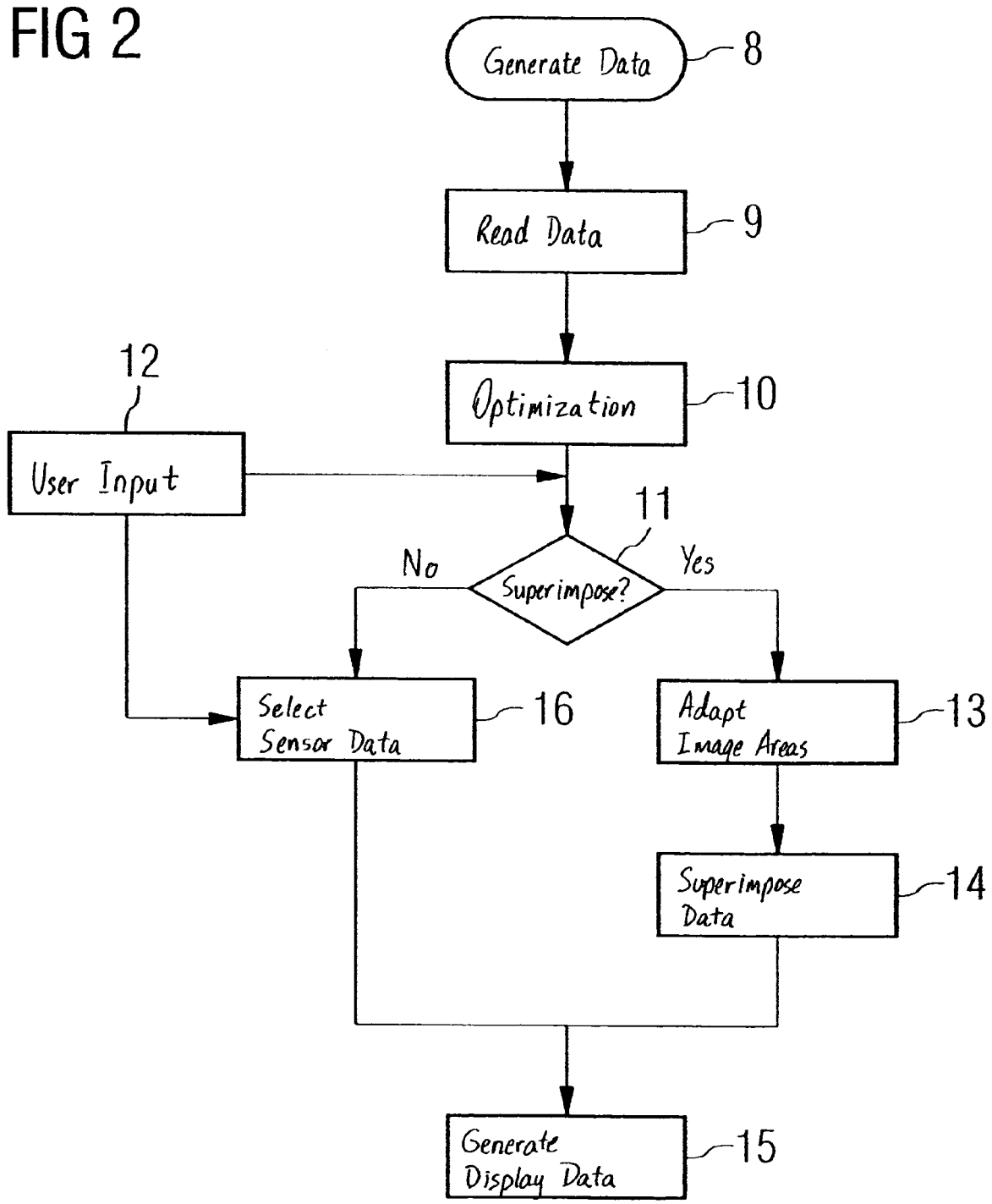
FIG. 2 is a first flowchart of the method according to the present invention.

According to the flowchart in FIG. 2, the data that is generated in the near-infrared camera system 1, the far-infrared camera system 2 and the sensor system 3 is conditioned in conditioning step 8 and read in by the near-infrared camera system 1 in step 9. The data is then fed to an optimization stage 10.

The data is passed through a noise filter, an edge filter and/or a contrast improving stage in the optimization stage 10.

Manually selected information which is to be used for modifying the data supplied by the system may be fed from a user input means 12 to the output of the optimization stage 10.

In step 11 it is determined whether the near-infrared data and far-infrared data is to be superimposed.

If a superimposition is to be carried out, the image areas of the two camera systems are adapted to one another, and if appropriate also restricted, in a step 13.

In step 14, the data is superimposed. Display data is generated in step 15 and a display panel of a display is actuated by the generated display data.

If the far-infrared data is determined not to be superimposed on the near-infrared data in step 11, the sensor data is selected, step 16, in accordance with the prescribed values of the user unit 12 which are then conditioned as display data and passed on for the actuation of the display panel of the display in step 15.

Using the user input means 12 it is possible to select the combination of the systems 1, 2, 3 which supply the best data for the respective situation.

Figure 3:
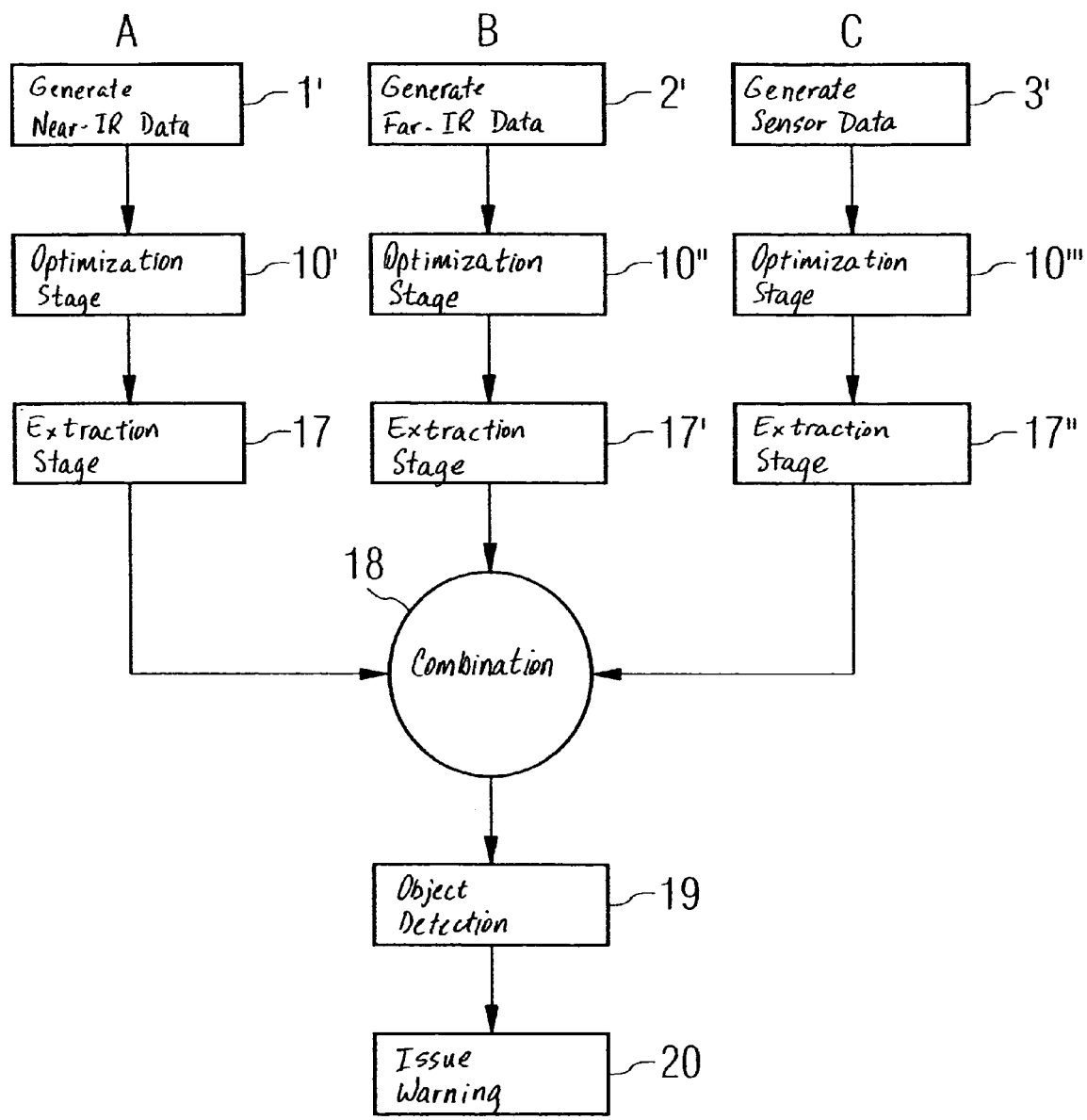
FIG. 3 is a second flowchart of the method.

FIG. 3 shows a flow chart having a branch A in which the near-infrared data which is generated by a near-infrared camera system 1' and is fed to an optimization stage 10' and conditioned therein in an optimized way. The optimized near-infrared data is then fed to a feature extraction stage 17 in which the data for sensed objects is extracted and passed on to a combination stage 18.

According to the same procedure, in a branch B the far-infrared data is generated by a far-infrared camera system 2' and is fed to the combination stage 18 via an optimization stage 10'' and a feature extraction stage 17'.

The procedure in a branch C also corresponds to this. In branch C, the sensor data generated by a sensor system 3' is fed to the combination stage 18 via an optimization stage 10''' and a feature extraction stage 17''.

In the combination stage 18, display data which is further processed in an object detection stage 19 is generated from the data from all, or from some, of the branches A, B and C, for example by superimposition. If an object which presents a danger is recognized in this process, a visual or audible warning is issued in a warning stage 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for representing the front field of vision from a motor vehicle on a display panel of a display, comprising the steps of:

sensing, by an infrared camera system, the field of vision and feeding corresponding infrared data to a data processing unit;

modifying the sensed infrared data in the data processing unit on the basis of further information fed to the data processing unit;

supplying the modified infrared data as display data for actuating the display, wherein the infrared camera system includes a near-infrared camera system and a far infrared camera system, the near-infrared camera system senses the light from an infrared light source which is reflected from the field of vision and supplies corresponding near-infrared data to the data processing unit, the far-infrared camera system senses the thermal radiation from the field of vision and supplies corresponding far-infrared data to the data processing unit, and physical variables from the field of vision are sensed by at least one sensor and fed as corresponding sensor data to the data processing unit; and restricting the field of vision in the data processing unit when processing the near-infrared data and identifying objects in the restricted field of vision when processing the far-infrared data.

2. The method of claim 1, further comprising the step of modifying, in the data processing unit, the near-infrared data by superimposing the near-infrared data with the far-infrared data to form display data.

3. The method of claim 1, further comprising the step of sensing physical variables from the field of vision by the at least one sensor and feeding the corresponding sensor data to the data processing unit, wherein the at least one sensor include at least one of a radar sensor, an ultrasonic sensor, and ultraviolet sensor.

4. The method of claim 1, further comprising the step of feeding at least one of the near-infrared data, the far-infrared data, and the sensor data through an optimization stage in the data processing unit.

5. The method of claim 4, further including the step of passing the at least one of the near-infrared data, the far-infrared data, and the sensor data through a noise filter in the optimization stage.

6. The method of claim 5, further including the step of passing the at least one of the near-infrared data, the far-infrared data, and the sensor data through an edge filter in the optimization stage.

7. The method of claim 6, further including the step of passing the at least one of the near-infrared data, the far-infrared data, and the sensor data through a contrast improving stage in the optimization stage.

8. The method of claim 5, further including the step of passing the at least one of the near-infrared data, the far-infrared data, and the sensor data through a contrast improving stage in the optimization stage.

9. The method of claim 4, further including the step of passing the at least one of the near-infrared data, the far-infrared data, and the sensor data through a contrast improving stage in the optimization stage.

10. The method of claim 4, further including the step of passing the at least one of the near-infrared data, the far-infrared data, and the sensor data through an edge filter in the optimization stage.

11. The method of claim 1, further comprising the step of extracting areas of the image information represented by the data in the data processing unit when processing at least one of the near-infrared data, the far-infrared data, and the sensor data.

12. The method as claimed in claim 1, further comprising the step of superimposing a virtual lattice on the display data defined by the near-infrared data.

13. The method as claimed in claim 12, wherein one side of the lattice corresponds to the boundary of the roadway.

14. The method of claim 13, further comprising the step of generating one of a visual and audible warning signal by the data processing unit when an object is identified in the restricted field of vision.

15. The method of claim 12, further comprising the step of generating one of a visual and audible warning signal by the data processing unit when an object is identified in the restricted field of vision.

16. The method of claim 1, further comprising the step of generating one of a visual and audible warning signal by the data processing unit when an object is identified in the restricted field of vision.

17. The method of claim 1, further comprising the step of adding at least a portion of the near-infrared data to the far-infrared data by the data processing unit to form complete display data items of an object.

* * * * *